United States Patent [19]

Möller et al.

[11] 4,241,958
[45] Dec. 30, 1980

[54] AXIAL THRUST BEARING

[75] Inventors: Wolfgang Möller, Nussbaumen; Hans Schwarz, Umiken, both of Switzerland

[73] Assignee: BBC Brown Boveri & Company Limited, Baden, Switzerland

[21] Appl. No.: 73,379

[22] Filed: Sep. 7, 1979

[30] Foreign Application Priority Data

Sep. 14, 1978 [CH] Switzerland ............ 9627/78

[51] Int. Cl.³ .................................. F16C 17/06
[52] U.S. Cl. ............................ 308/160; 308/168
[58] Field of Search ............... 308/160, 168, 170, 172, 308/161, 146, 135

[56] References Cited

U.S. PATENT DOCUMENTS 2,778,696  1/1957  Lease ............................ 308/160
3,814,487  6/1974  Gardner ........................ 308/160
3,893,737  7/1975  Tyson ........................... 308/168
4,077,682  3/1978  Gardner ........................ 308/168

*Primary Examiner*—Lenard A. Footland
*Attorney, Agent, or Firm*—Burns, Doane, Swecker & Mathis

[57] ABSTRACT

An axial thrust bearing includes a plurality of circumferentially arranged segments. The segments are constrained in the circumferential direction by means of support plates disposed therebetween. The segments are elastically supported by means of individual spring elements mounted in a bearing body. The segments are provided with support ribs having tilting edges. The support ribs are supported between the support plates, and the tilting edges are supported against the spring elements. As a result, friction between the segments is minimized.

6 Claims, 4 Drawing Figures

AXIAL THRUST BEARING

BACKGROUND AND OBJECTS OF THE INVENTION

The present invention relates to a collar thrust bearing for the axial support of a shaft, the bearing being of the type comprising a shaft collar and bearing segments distributed over the circumference of the bearing and spring elements comprising individual springs.

Various types of construction have heretofore been used for axial bearings. Thus, for example, bearings have been used in which the individual bearing segments are in abutment in the peripheral direction by means of extended projections by which a mutual spacing between them is achieved (see Cat. Ref. L 7/73 "Michell Bearings").

This known design of an axial bearing has the disadvantage, however, that the tilting motion, particularly of the segments which during the starting of the machine are already resting against the stop in the direction of rotation due to their own weight, is retarded by a high degree of friction.

According to a further known design of an axial bearing, mushroom-head screws are arranged with a collar between the individual bearing segments in the bearing body, by means of which the bearing segments are spaced in the direction of the periphery. The head of the screws engage in grooves in the segments, thus holding them in the axial direction with a predetermined clearance (Manual No. 5, 192/64, The Glacier Metal Comp., Ltd.). In this axial bearing, it is disadvantageous that there exists a great amount of friction and that, in addition, the screws can become loose. Arranging retaining screws between the individual segments can also impede the flow of lubricating oil.

In another known arrangement of segments in axial bearings, the bearing segments are held radially in a circumferential groove of the bearing body, in which arrangement the same groove also contains the compensating segments and the bearing segments, which are tiltable, arranged on radial ribs of the compensating segments. In addition, the bearing segments are provided with a radial bore for accommodating a retaining pin by which they are fixed to the bearing body with a predetermined clearance (Michell Bearings Manual, FIG. 23). This bearing arrangement has the disadvantage that if the retaining pin comes into contact with the bearing segment in an unfavorable position, the tilting movement can be impeded.

According to a further known design of an axial bearing, the bearing segments are held in the circumferential direction in a supporting block and are elastically supported by segment-like spring elements, wherein supporting ribs are arranged at the spring elements and the mountings accommodating the bearing segments and spring elements are screwed to the bearing body (see U.S. Pat. No. 2,778,696). By this known arrangement an expensive production is involved and the necessary bolting, assembly and disassembly is time-consuming. By arranging the bearing segments in supports in which also the spring elements are arranged, the bearing segments must be of relatively thin construction, by which a more frequent replacement is necessary.

It is the object of the present invention to provide a thrust bearing which does not have the above-mentioned disadvantages and in which the bearing segments are provided with the appropriate clearance and which does not require additional structural length.

SUMMARY OF THE INVENTION

According to the invention, the afore-mentioned objects are achieved, in that the segments of the axial bearing support ribs are provided with tilting edges by which the segments of the axial bearing are fixed between support plates in the circumferential direction and are elastically supported by the tilting faces of the spring elements. The bearing segments are provided with cooling ribs at the oil outlet side. Furthermore, the support plates are provided with bosses for fixing the support plates and spring elements in the circumferential direction. By fixing the axial bearing by means of support plates, the friction between the contact surfaces of the support plates and the segments is kept low so that the tilting movement of the axial bearing segments is not adversely affected. The spring elements, comprising individual springs, have the effect that, if the collar is inclined, each axial bearing segment rests equally over its whole contact plane against the shaft collar since all movements of the spring elements are independent of each other. Thus, all spring elements distributed circumferentially over the entire bearing have the same characteristics. The support plates also act to seal and form an oil conduit to the segments. The arrangement of tilting edges at the support ribs ensures advantageously that the contact areas between the support ribs and the spring elements are kept very small, whereby an almost frictionless tilting movement is achieved. According to the invention, the arrangement of bosses on the support plates, the need for special fixing, for example, bolting of the spring elements to the bearing body, or similar such arrangements, is eliminated. The movement of the spring elements is not at all impeded by this arrangement.

An additional cooling of the surfaces of the bearing segments and an increased radial oil circulation between the bearing segments are achieved by arranging cooling ribs on the axial bearing segments.

Furthermore, for fixing the spring elements the support plates are held axially in an annular groove(s) of the bearing body and the support ribs are provided with projections fixed axially and radially in the annular grooves of the bearing body.

By arranging the projections of the axial segment bearings in the annular groove of the bearing body, with clearance, the movement of the axial segment bearings and the movement of the spring elements in the axial direction can be synchronized.

THE DRAWING

The accompanying drawing shows one preferred embodiment of the invention, in which.

DETAILED DESCRIPTION OF A PREFERRED EMBODIMENT OF THE INVENTION

Figure 1:
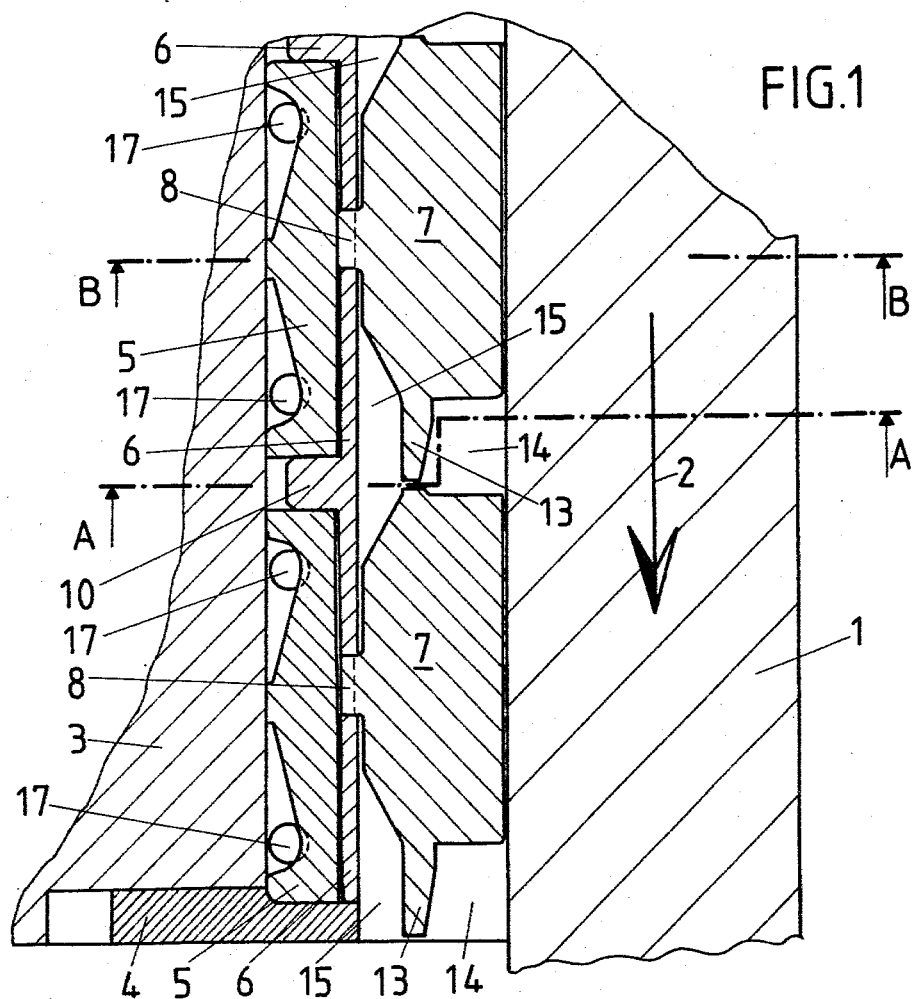
FIG. 1 shows a longitudinal section through an axial bearing.

In the Figures, numeral 1 designates a shaft collar, the direction of rotation of which is indicated by an arrow 2. In a bearing body 3 arranged in a bearing housing 20, spring elements 5, formed of individual springs with support plates 6, are held by a stop 4. Between the shaft collar 1 and the spring elements 5, bearing segments 7 of the axial bearing are uniformly distributed over the circumference of the bearing. The segments 7 fit into intermediate spaces between the support plates 6 and are provided at their planes opposite to the shaft collar 1 with support ribs 8 for radial and axial guidance of the segments 7.

Figure 1A:
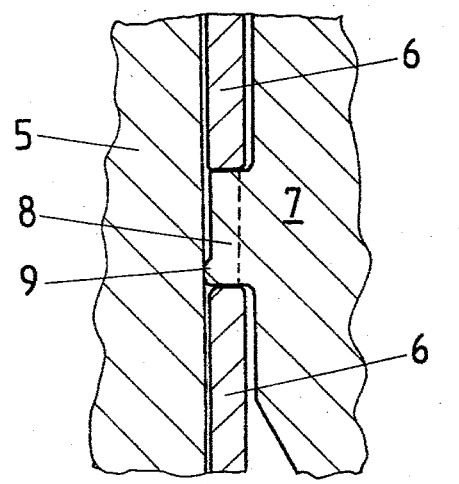
FIG. 1a shows a detail of the axial bearing according to FIG. 1.

As can be seen from the detail view in FIG. 1a, the support ribs 8 are provided with tilting edges 9 by which a tilting movement between the spring elements 5 and the segments 7 of the axial bearing is possible.

Figure 2:
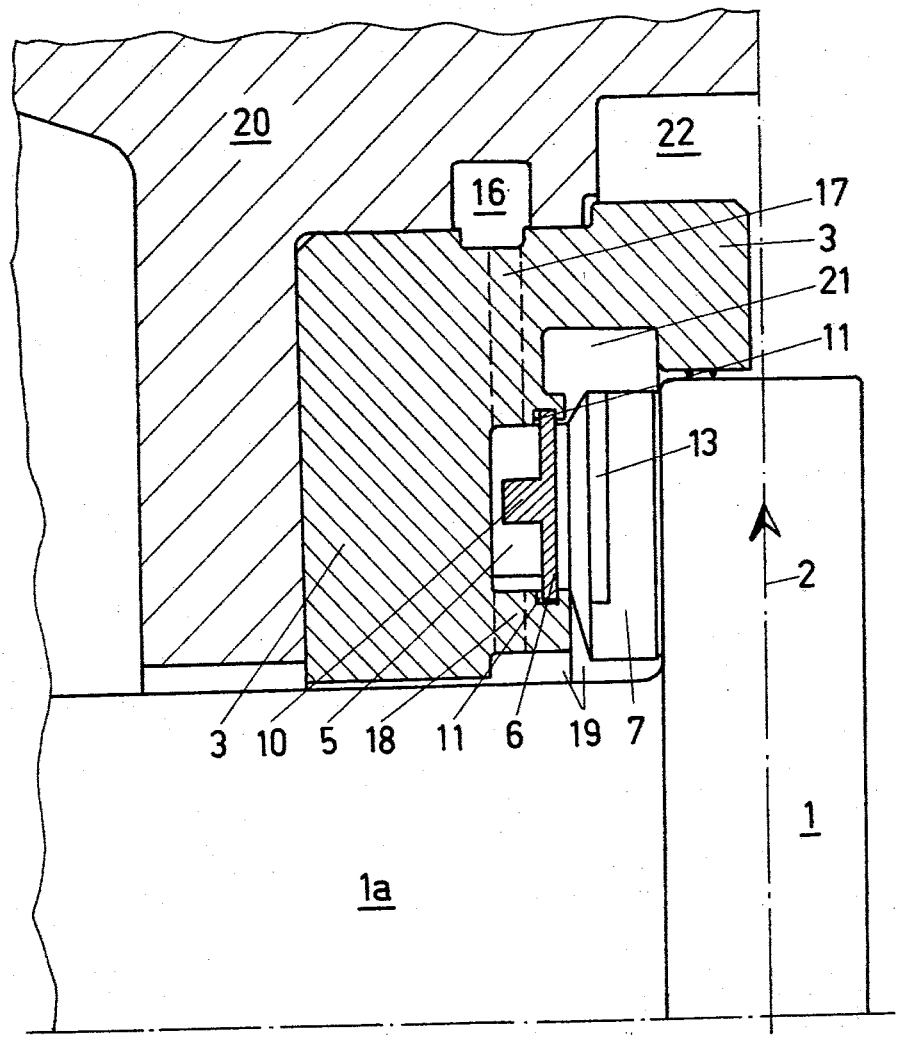
FIG. 2 shows a longitudinal section along the intersection A—A in FIG. 1.
Figure 3:
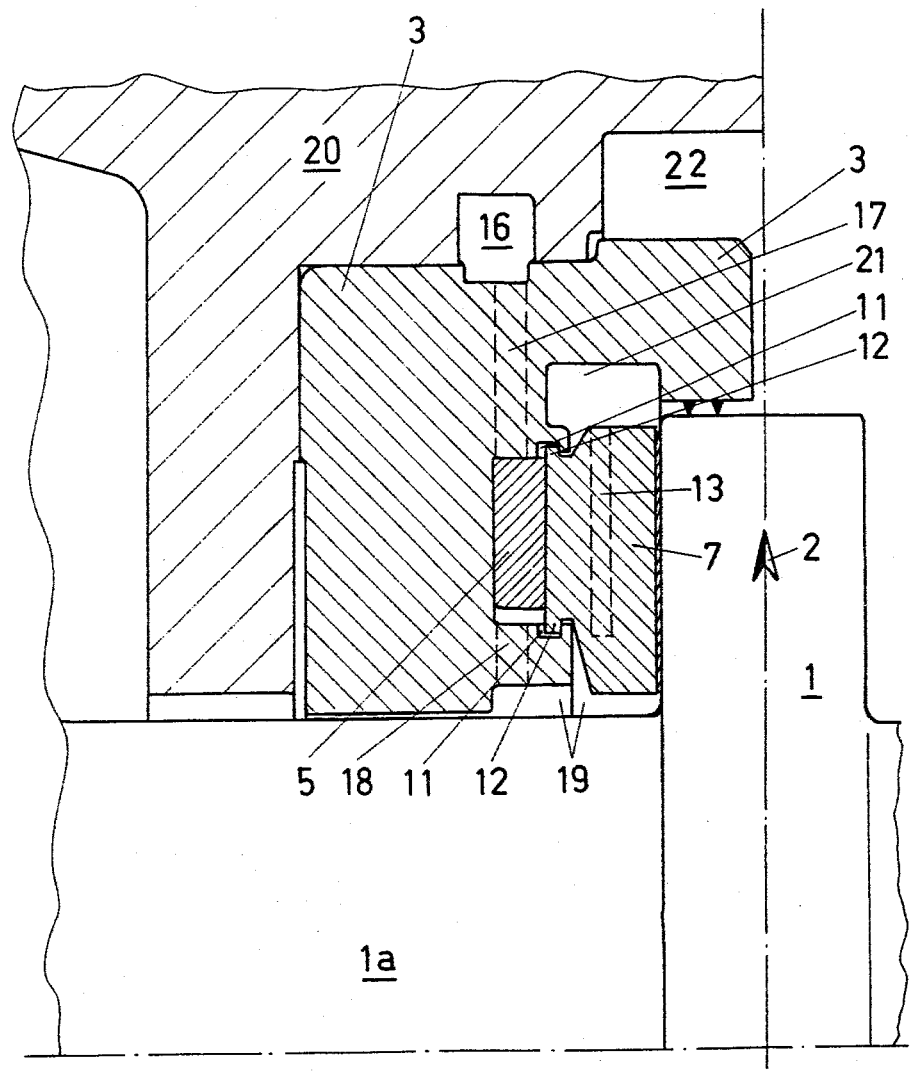
FIG. 3 shows a longitudinal section along the intersection B—B in FIG. 1.

The support plates 6 are provided with bosses 10 disposed circumferentially between the spring elements 5, fixing the latter in the circumferential direction. An annular groove 11 formed in the bearing body 3 receives, with clearance, the support plates 6, fixing them in the axial direction (FIG. 2). In the same annular groove 11, projections 12 of the support ribs 8 are received with clearance, fixing the segments 7 of the axial bearing in the axial and radial direction.

The segments 7 of the axial bearing are provided with cooling ribs 13 which separate oil circulation passages 14, 15 from one another. Oil circulates around the segments 7 and also around the cooling ribs 13, and thus an additional cooling of the surfaces of the segments 7 of the axial bearing is achieved. The axial bearing is supplied with lubrication oil via a fresh oil feed channel 16. The fresh oil is conducted through radial bores 17 toward the spring elements 5 and proceeds via a bore 18 and an oil space 19 into the oil passages 14, 15 where it lubricates the segments 7 of the axial bearing, and then flows via an annular channel 21 into an oil outlet channel 22.

The presence of cooling ribs 13 projecting into the oil passages 14, 15 cause, apart from the afore-mentioned cooling of the surfaces of the segments 7 of the axial bearing on the oil outlet side, an increased radial oil circulation around the cooling ribs 13. This makes it possible to reduce the distances of the individual segments 7 of the axial bearing with respect to one another and, therefore to arrange a greater number of segments 7 of the axial bearing over the whole circumference of the axial bearing and thus to absorb a higher axial thrust of the shaft 1a.

By fixing the axial bearing by means of support plates 6 the friction between the contact surfaces of the support plates and the segments 7 is kept low so that the tilting movement of the axial bearing segments 7 is not adversely affected. The spring elements 5 have the effect that, if the collar 1 is inclined, each axial bearing segment rests equally over its whole contact plane against the shaft collar since all movements of the spring elements are independent of each other. Thus, all spring elements distributed circumferentially over the entire bearing have the same characteristics. The support plates also act to seal and conduct oil to the segments 7. The arrangement of tilting edges at the support ribs 8 ensures advantageously that the contact areas between the support ribs and the spring elements are kept very small by which an almost frictionless tilting movement is achieved. According to the invention, the arrangement of bosses 10 on the support plates eliminates the need for special fixing, for example, by means of bolting the spring elements to the bearing body, or similar arrangements. The movement of the spring elements is not at all impeded by this arrangement.

An additional cooling of the surfaces of the bearing segments and an increased radial oil circulation between the bearing segments are achieved by the cooling ribs 13 arranged on the axial bearing segments.

By arranging the projections of the segments 7 in the annular groove(s) 11 of the bearing body 3, with clearance, the movement of the segments and the movement of the spring elements in the axial direction can be synchronized.

Although the invention has been described in connection with a preferred embodiment thereof, it will be appreciated by those skilled in the art that additions, substitutions, modifications, and deletions not specifically described may be made without departing from the spirit and scope of the invention as defined in the appended claims.

What is claimed is:

1. A thrust bearing for axially supporting a rotary shaft, said thrust bearing comprising:
    a plurality of bearing segments disposed circumferentially around said shaft for axially contacting a portion of said shaft, said segments including longitudinal support ribs;
    a plurality of individual spring elements arranged circumferentially and disposed axially of said segments; and
    a plurality of circumferentially arranged support plates disposed between said segments and said springs, said support plates including longitudinal bosses disposed circumferentially between said spring elements to locate said support plates relative to said spring elements in the circumferential direction;
    said support ribs extending circumferentially between said support plates, so said support plates locate said segments in the circumferential direction;
    said support ribs including tilt edges facing said spring elements and accommodating relative tilting movement therebetween so said spring elements elastically support said segments in the longitudinal direction;
    said segments being spaced to form oil conducting passages therebetween, said segments including cooling ribs projecting into said passages.

2. Apparatus according to claim 1 including a bearing body extending circumferentially around said shaft, said bearing body forming means for supporting said support plates in the longitudinal direction whereby said support plates support said spring elements in the longitudinal direction.

3. Apparatus according to claim 2, wherein said last-named means supporting said support plates in the longitudinal direction comprises an annular groove which receives portions of said support plates.

4. Apparatus according to claim 1 including a bearing body extending circumferentially around said shaft, said bearing body forming means for supporting said segments in the longitudinal and radial directions.

5. Apparatus according to claim 4, wherein said means supporting said last-named means supporting said segments comprises an annular groove which receives portions of said support ribs.

6. Apparatus according to claim 1 including means for conducting oil to said springs and then to said passages.

* * * * *